No. 781,790. PATENTED FEB. 7, 1905.
W. R. SELF.
COTTON CHOPPER.
APPLICATION FILED FEB. 17, 1904.

Witnesses
William R. Self Inventor
by C. A. Snow & Co.
Attorneys

No. 781,790.  Patented February 7, 1905.

UNITED STATES PATENT OFFICE.

WILLIAM R. SELF, OF NEWTON, NORTH CAROLINA.

COTTON-CHOPPER.

SPECIFICATION forming part of Letters Patent No. 781,790, dated February 7, 1905.

Application filed February 17, 1904. Serial No. 194,085.

*To all whom it may concern:*

Be it known that I, WILLIAM R. SELF, a citizen of the United States, residing at Newton, in the county of Catawba and State of North Carolina, have invented a new and useful Cotton-Chopper, of which the following is a specification.

This invention relates to cotton-choppers, and especially to cotton-chopping attachments for harrows, cultivators, and similar implements used for cultivating the soil.

The invention has for its object to provide a device of this class which shall be simple in construction, durable and efficient in operation, which may be produced at a small expense, and which may be very readily connected with or detached from the cultivating implement in connection with which it is to be used.

With these and other objects in view the invention consists in the improved construction, arrangement, and combination of parts which will be hereinafter fully described, and particularly pointed out in the claims.

Figure 1:
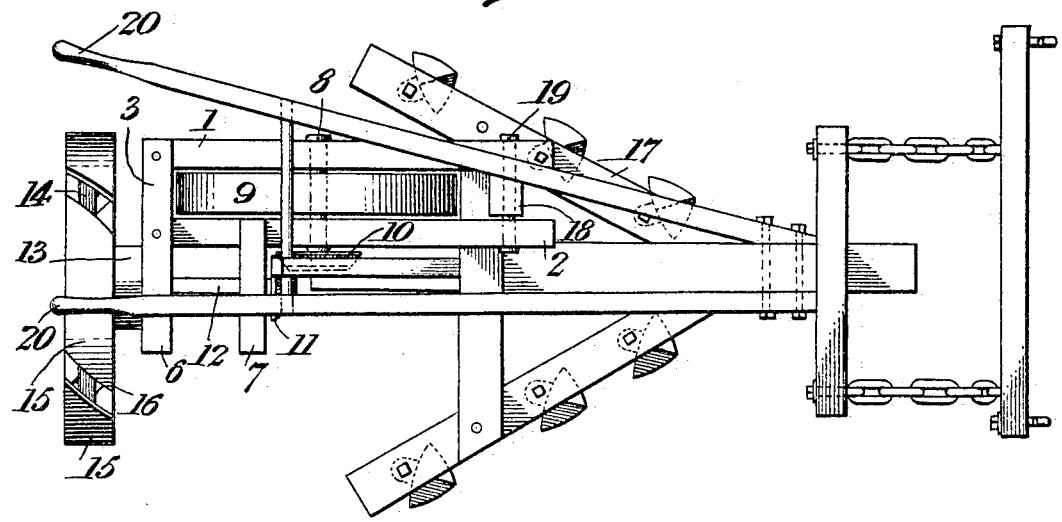
Figure 2:
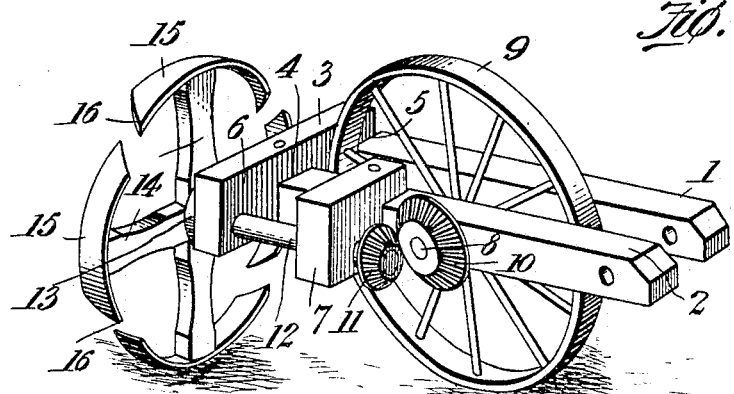
Figure 3:
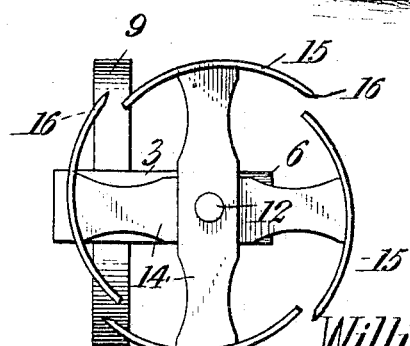

In the accompanying drawings, Figure 1 is a plan view showing my improved cotton-chopping attachment connected with the frame of a harrow of ordinary construction. Fig. 2 is a perspective view showing the device detached. Fig. 3 is a rear elevation of the same.

Corresponding parts in the several figures are indicated by similar numerals of reference.

My improved cotton-chopping attachment comprises a pair of longitudinal frame-beams 1 2, the rear ends of which are connected and spaced apart by a cross-piece 3, having notches or recesses 4 5 for the accommodation of the rear ends of said side pieces, and which said cross-piece extends laterally from the longitudinal frame-piece 2, so as to form a bracket 6. A similar bracket 7 is secured to and extends laterally from the frame-piece 2 a short distance in front of the bracket 6. The side pieces 1 2 afford bearings for a transverse shaft or axle 8, upon which, between the side pieces 1 2, is mounted a ground-engaging wheel 9. The inner end of the axle 8 carries a bevel-pinion 10, meshing with a bevel-pinion 11 upon the front end of a shaft 12, which is journaled in the brackets 6 and 7 at right angles to the axle 8. The shaft 12 extends rearwardly of the cross-piece 3 and has a spacing-collar 13 and a chopping implement comprising a plurality of radiating arms 14, each carrying at its outer end a blade 15, which is disposed eccentrically to the shaft 12. The blades 15 constitute the chopping-hoes, and their ends are cut off obliquely, as shown, the earth-engaging end of each blade, which is the end spaced farthest apart from the axis of the shaft 12, being provided with an earth-engaging point 16, which when the device is in operation operatively engages the soil.

17 designates a harrow or cultivator which is of ordinary construction and which is provided with an upwardly-extending lug 18, with which the front ends of the side beams 1 2 of my improved attachment are hingedly connected by means of a transverse bolt 19. The cultivator-frame 17 is provided with handles 20, by means of which the combined device may be conveniently guided.

From the foregoing description, taken in connection with the drawings hereto annexed, the operation and advantages of this invention will be readily understood. My improved cotton-chopping attachment may, as will be readily seen, be connected with or detached from any suitably-constructed cultivating implement by means of the single connecting-bolt 19, which forms a pivot upon which the frame of the cotton-chopping attachment may swing up and down, so as to adapt itself to inequalities in the surface of the ground. When the machine progresses, the ground-engaging wheel 9 will through the medium of the bevel-gearing 10 11 impart a rotary motion to the shaft 12 carrying the chopper, the blades of which will engage the row of growing plants at intervals, thus thinning the row by removing the surplus plants.

It will be observed that this invention is in the nature of an attachment to a cultivating implement and that the latter may be either a harrow, a cultivator, or any other well-known implement of the class referred to. My improved attachment is specially constructed in such a manner as to provide a special narrow frame having an earth-engaging wheel and which may be connected hingedly with a suitable post or lug at one side of the cultivating implement and which may be readily bolted to the latter in such a position that the cotton-chopping device, which is supported by lateral extensions of the frame carrying the ground-engaging wheel, shall be properly centered with relation to the cultivating implement, while the earth-engaging wheel will travel upon and engage the ground at one side of the row. The front ends of the side members of the frame which carries the earth-engaging wheel are therefore not connected, but will be suitably spaced apart by the post with which the said frame is connected by means of the hinge-bolt 19. This arrangement also obviously provides for an up-and-down play of the frame carrying the ground-wheel and with which the cotton-chopping devices are also connected in the manner described.

The device, as will be seen from the foregoing, is extremely simple in its construction, and the chopping device will be found extremely efficient in removing the surplus growth, while the cultivating implement with which it is connected will stir and agitate the soil, thus permitting the growth of such plants as are left standing.

I desire it to be understood that while I have in the foregoing described a simple and preferred construction of my invention I do not necessarily limit myself to the precise structural details therein set forth, but reserve the right to any changes, alterations, and modifications which may be resorted to within the scope of my invention and without departing from the spirit or sacrificing the efficiency of the same.

Having thus described my invention, I claim—

1. A cotton-chopping attachment comprising a pair of longitudinal side beams, a rear cross-bar connecting and spacing apart the said side beams and having a lateral extension forming a bracket, an auxiliary bracket extending from one of the side pieces, an axle journaled in said side pieces, a ground-engaging wheel mounted upon the axle between said side pieces, a shaft journaled in the laterally-extending brackets, miter-gearing connecting said shaft with the axle, and a cotton-chopping implement upon the rear end of said shaft.

2. The combination with a cultivating implement having an upwardly-extending post, of a cotton-chopping attachment comprising a frame having disconnected front ends adapted to engage the opposite sides of the post and connected with the latter by means of a hinge-bolt, a ground-engaging wheel journaled between the side pieces of said hinged frame, a rear cross-bar connecting and spacing apart the said side beams and having a lateral extension forming a bracket, an auxiliary bracket extending from one of the side pieces, a shaft journaled in said laterally-extending brackets at right angles to the axle of the ground-engaging wheel, means for transmitting motion from the latter to the former, and a cotton-chopping implement upon said shaft.

In testimony that I claim the foregoing as my own I have hereto affixed my signature in the presence of two witnesses.

WILLIAM R. SELF.

Witnesses:
 GEO. W. COCHRAN,
 W. H. WESTALL.